United States Patent
Beneditz

(10) Patent No.: US 8,699,188 B2
(45) Date of Patent: Apr. 15, 2014

(54) SHUNT REGULATOR FOR OVERVOLTAGE PROTECTION AT TRANSFORMER RECTIFIER UNIT OF ELECTRICAL GENERATING SYSTEM

(75) Inventor: Bruce D. Beneditz, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 604 days.

(21) Appl. No.: 12/912,868

(22) Filed: Oct. 27, 2010

(65) Prior Publication Data

US 2012/0106007 A1     May 3, 2012

(51) Int. Cl.
    *H02H 9/00*     (2006.01)
(52) U.S. Cl.
    USPC ............... 361/18; 361/56; 361/91.1; 361/111
(58) Field of Classification Search
    USPC ..................... 361/56, 91.1, 111, 18
    See application file for complete search history.

(56) References Cited

U.S. PATENT DOCUMENTS

| | | | |
|---|---|---|---|
| 2,832,900 A | 4/1958 | Ford | |
| 4,017,788 A | 4/1977 | Stepp et al. | |
| 4,629,967 A | 12/1986 | Voss | |
| 4,659,978 A | 4/1987 | Dogadko | |
| 5,333,105 A * | 7/1994 | Fortune | 363/56.11 |
| 6,141,193 A | 10/2000 | Mercer | |
| 6,301,133 B1 * | 10/2001 | Cuadra et al. | 363/65 |
| 6,838,860 B2 | 1/2005 | Huggett et al. | |

OTHER PUBLICATIONS

Horowitz et al., The Art of Electronics, 2006, The Press Syndicate of the University of Cambridge, Second Edition, 229-230.*

* cited by examiner

*Primary Examiner* — Rexford Barnie
*Assistant Examiner* — Tien Mai
(74) *Attorney, Agent, or Firm* — Cantor Colburn LLP

(57) ABSTRACT

An electrical system includes an alternating current (AC) source; a transformer rectifier unit (TRU) connected to the AC source, the TRU configured to receive AC power from the AC source, convert the AC power to direct current (DC) power, and output DC power; a DC bus configured to receive the DC power output by the TRU; at least one DC load powered by the DC bus; and a shunt regulator connected to the output of the TRU, the shunt regulator configured to overload the output of the TRU in the event of an overvoltage condition at the output of the TRU, such that a voltage available to the DC bus during the overvoltage condition does not exceed a reference voltage.

12 Claims, 3 Drawing Sheets

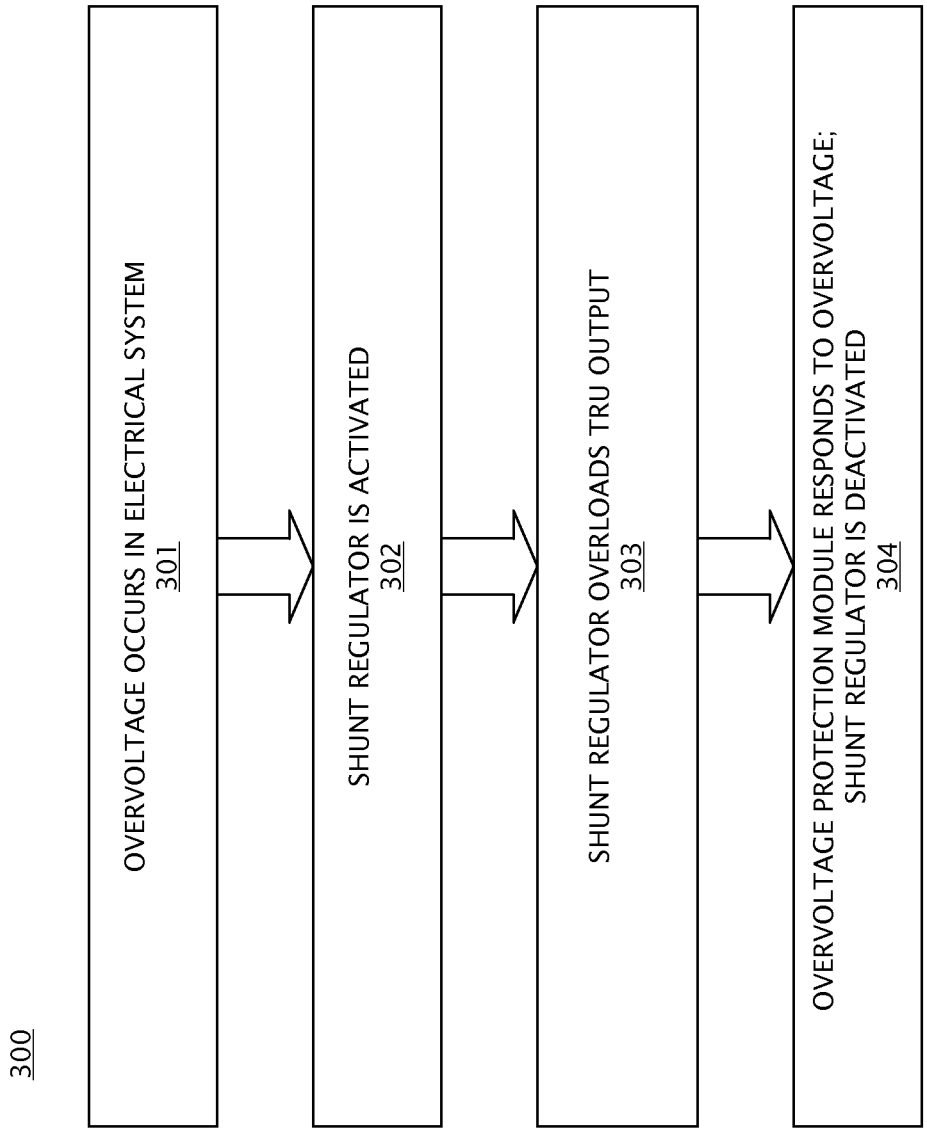

SHUNT REGULATOR FOR OVERVOLTAGE PROTECTION AT TRANSFORMER RECTIFIER UNIT OF ELECTRICAL GENERATING SYSTEM

FIELD OF INVENTION

The subject matter disclosed herein relates generally to the field of overvoltage protection in an electrical generating system.

DESCRIPTION OF RELATED ART

Overvoltage conditions in an electrical generating system may cause damage to electrical loads, including alternating current (AC) or direct current (DC) loads, powered by the electrical generating system. For example, an aircraft electric power system may have various loads, including loads that include circuitry that is critical for flight operations, powered by a generator in the electrical generating system. Overvoltage conditions from the generator may result in a catastrophic event in the aircraft due to exposure of a critical load to a voltage outside the load's rated limits, which may cause a critical load to fail.

One way of preventing overvoltage in an electrical generating system is to provide one or more overvoltage protection modules in a generator control unit (GCU) that is connected to the generator. A constant frequency (CF) generator may magnetically saturate at a voltage below the maximum ceiling voltage tolerated by the overvoltage protection module circuitry. This gives time for the overvoltage protection module(s) to de-excite and disconnect the generator from the loads. However, if the generator is a variable frequency (VF) generator a maximum ceiling voltage may be produced that is far in excess of the maximum allowable voltage for the critical loads. Also, the voltage rise for a VF generator due to a failed on excitation may be too fast to protect with the traditional overvoltage protection circuitry; the overvoltage may be on the bus for a period of time of 10 s or 100 s of milliseconds (ms) before the overvoltage is detected by an overvoltage protection module and the generator is taken off line, allowing the overvoltage to be experienced by loads powered by the generator, which may including flight critical equipment in an aircraft electrical generating system that may act in an adverse way or suffer damage when exposed to the overvoltage.

BRIEF SUMMARY

According to one aspect of the invention, an electrical system includes an alternating current (AC) source; a transformer rectifier unit (TRU) connected to the AC source, the TRU configured to receive AC power from the AC source, convert the AC power to direct current (DC) power, and output DC power; a DC bus configured to receive the DC power output by the TRU; at least one DC load powered by the DC bus; and a shunt regulator connected to the output of the TRU, the shunt regulator configured to overload the output of the TRU in the event of an overvoltage condition at the output of the TRU, such that a voltage available to the DC bus during the overvoltage condition does not exceed a reference voltage.

According to another aspect of the invention, a method for limiting an overvoltage condition at an output of a transformer rectifier unit (TRU) of an electrical system includes activating a shunt regulator in response to the overvoltage condition, the shunt regulator being connected to the output of the TRU; overloading the output of the TRU by the shunt regulator such that a voltage available to a DC bus is less than a reference voltage; limiting an alternating current (AC) voltage received from an AC source at an input of the TRU in response to the overvoltage condition by an overvoltage protection module; and deactivating the shunt regulator.

According to another aspect of the invention, a shunt regulator for an electrical system, the electrical system comprising a transformer rectifier unit (TRU), includes an operational amplifier, the operational amplifier configured to receive a reference voltage and an output voltage of the TRU as inputs; and a transistor, the transistor configured to receive an output of the operational amplifier as a gate voltage, the output voltage of the TRU as a source voltage, and wherein a drain of the transistor is connected to ground.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES:

FIG. 3 illustrates an embodiment of a method of operating an electrical generating system having a shunt regulator for overvoltage protection at a transformer rectifier unit.

DETAILED DESCRIPTION

Embodiments of an electrical generating system having a shunt regulator for overvoltage protection at a transformer rectifier unit (TRU), and a method of operating an electrical generating system having a shunt regulator for overvoltage protection at a TRU, are provided, with exemplary embodiments being discussed below in detail. An overvoltage in an electrical generating system can be dealt with downstream of a TRU, as the output of the TRU may be relatively low power as compared to the power on an AC bus of the electrical generating system. Current output of the TRU may be limited due to impedance and saturation, and the output voltage of the TRU may also be relatively low. The shunt regulator may act to limit the TRU output voltage to less than a maximum ceiling voltage allowed for any loads powered by the electrical generating system by applying additional output load to the TRU, thereby overloading the TRU output. In an embodiment in which the electrical generating system is located in an aircraft, flight-critical aircraft loads, which are typically DC powered, may be protected by the shunt regulator at the TRU output. Any overvoltage protection modules in the GCU may then have time to react to the overvoltage and disconnect the generator without damage to the DC loads. The shunt regulator is an active clamp that may be tested pre-flight, and may only be applied as needed to TRU outputs that power flight critical equipment.

Figure 1:
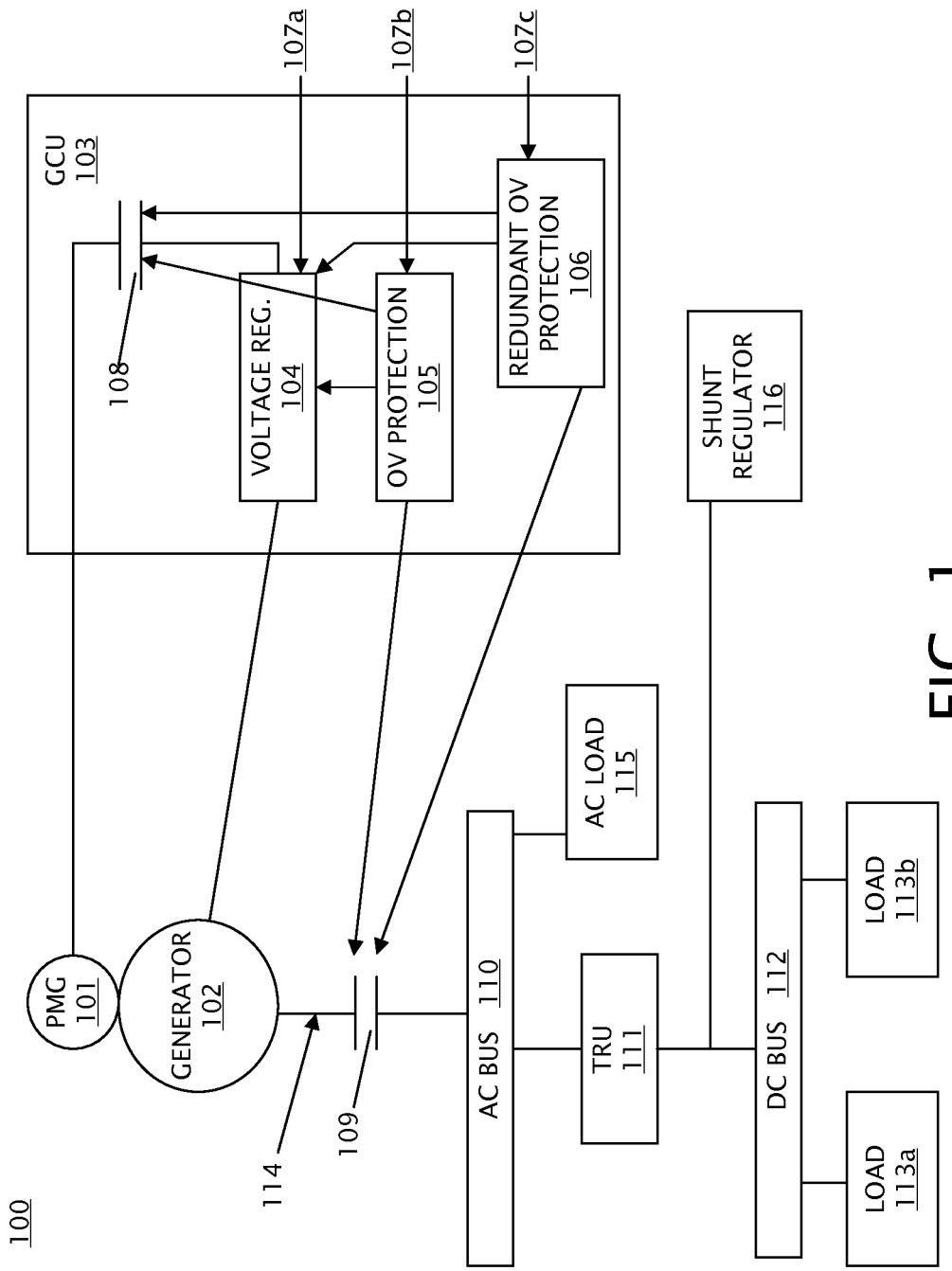
FIG. 1 illustrates an embodiment of an electrical generating system having a shunt regulator for overvoltage protection at a transformer rectifier unit.

FIG. 1 illustrates an embodiment of an electrical generating system 100 having a shunt regulator 116 for overvoltage protection at a TRU 111. Electrical generating system 100 includes a permanent magnet generator (PMG) 101 and a generator 102. PMG 101 provides an excitation voltage to generator 102 via GCU 103. PMG 101, generator 102, and GCU 103 are shown for illustrative purposes only; a shunt regulator for overvoltage protection at a TRU may be used to protect a DC bus in any electrical system that includes a TRU. Generator 102 powers AC bus 110 via line contactor 109. AC bus 110 may power one or more AC loads 115 in some embodiments. AC power from AC bus 110 is converted to DC power by TRU 111, and the DC power from TRU 111 powers DC bus 112. Shunt regulator 116 is connected to the output of TRU 111. DC loads 113a-b are powered by DC bus 112. Regulation point 114, located between generator 102 and line contactor 109, is connected to points of regulation (PORs) 107a-c; voltage from regulation point 114 is provided to the GCU 103 at PORs 107a-c. DC loads 113a-b and AC load 115 are shown for illustrative purposes only; an electrical generating system 100 may power any appropriate number and type of loads in various embodiments. Electrical generating system 100 may be located in an aircraft in some embodiments, and DC loads 113a-b may be flight-critical loads in the aircraft in some embodiments.

GCU 103 acts to regulate the excitation voltage from PMG 101 to generator 102, thereby limiting the output of generator 102 and prevent overvoltage conditions in electrical generating system 100. GCU 103 includes a generator control relay 108, a voltage regulator 104, overvoltage protection module 105, and redundant overvoltage protection module 106. The excitation voltage from PMG 101 is sent via generator control relay 108 to voltage regulator 104 en route to generator 102. Voltage regulator 104 acts to keep the excitation voltage output by GCU 103 to generator 102 at a target voltage based on input from POR 107a. Overvoltage protection module 105 and redundant overvoltage protection module 106 are also each connected to a respective POR 107b-c, which receives voltage data from regulation point 114. During normal operation, generator control relay 108 is closed, and PMG 101 excites generator 102 via generator control relay 108 and voltage regulator 104. PORs 107a-c are shown for illustrative purposes only, the PORs may be configured in any appropriate manner that provides voltage data from a regulation point in the electrical generating system to the GCU. Overvoltage protection module 105 and redundant overvoltage protection module 106 are also shown for illustrative purposes only; a GCU may include any appropriate number or type of overvoltage protection modules.

Overvoltage conditions at regulation point 114 may be detected by either or both of overvoltage protection module 105 or redundant overvoltage protection module 106 based on input from their respective PORs 107b-c. In response to overvoltage conditions, either overvoltage protection module 105 or redundant overvoltage protection module 106 may open generator control relay 108 and/or line contactor 109, and/or may turn off voltage regulator 104. However, due to possible delays in operation of overvoltage protection module 105 and redundant overvoltage protection module 106, shunt regulator 116 is also triggered by overvoltage conditions at the output of TRU 111. Shunt regulator 116 acts to draw power from the output of TRU 111 to protect loads 113a-b connected to DC bus 112.

Figure 2:
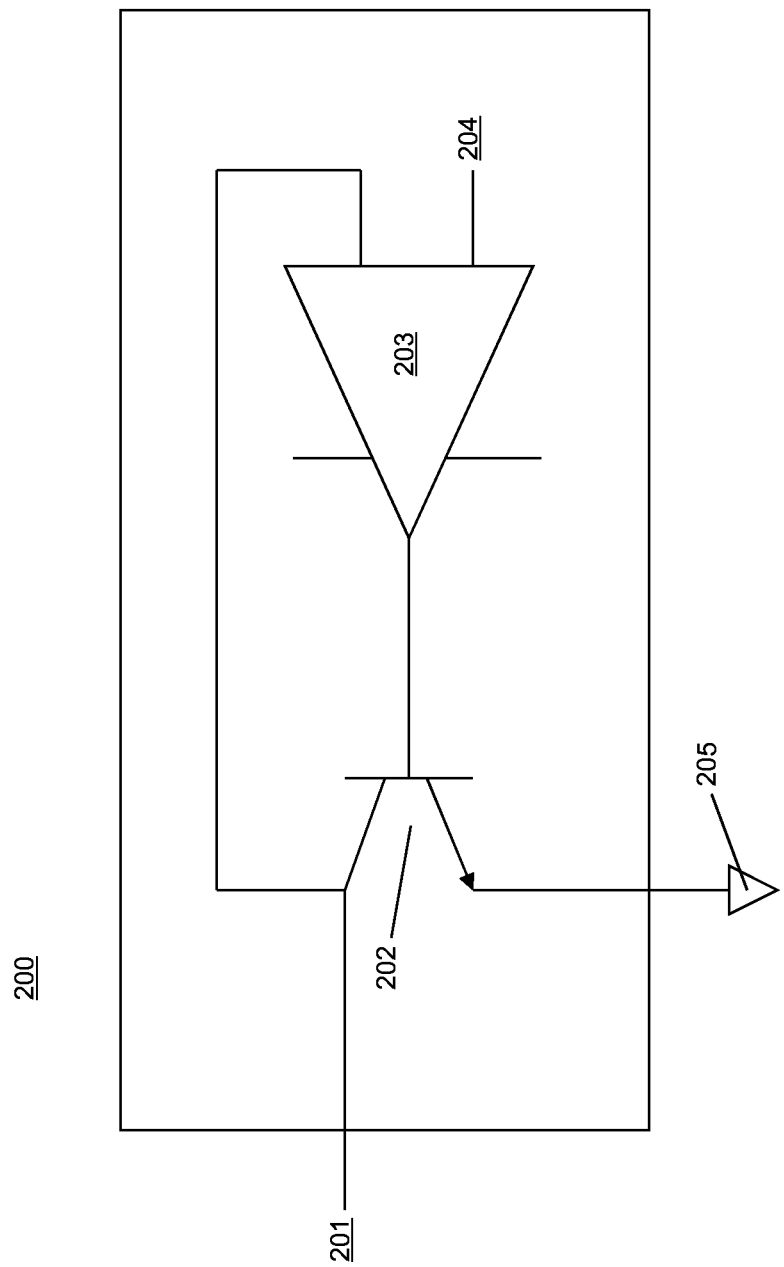
FIG. 2 illustrates an embodiment of a shunt regulator for overvoltage protection.

FIG. 2 illustrates an embodiment of a shunt regulator 200 for overvoltage protection. Shunt regulator 200 may comprise shunt regulator 116 of FIG. 1 in some embodiments. Input 201 is connected to the output of TRU 111 of FIG. 1. Transistor 202 includes a gate, source, and drain; the source of transistor 202 is connected to input 201 and to an input of operational amplifier 203; the drain of transistor 202 is connected to ground connection 205; and the gate is connected to the output of operational amplifier 203. Operational amplifier 203 receives reference voltage 204. Reference voltage 204 is a voltage limit that is below a predetermined ceiling voltage at which loads 113a-b may be damaged. When the voltage output by TRU 111 to shunt regulator input 201 exceeds the reference voltage 204 (i.e., an overvoltage condition exists at the output of TRU 111), the operational amplifier 203 biases the transistor gate voltage to on, such that transistor 202 draws current from the output of the TRU 111 at input 201. This causes the voltage on DC bus 112 from TRU 111 to drop to the level of reference voltage 204. The shunt regulator 116 acts to protect DC loads 113a-b until overvoltage protection modules 105 or 106 in the GCU 103 have time to react to the overvoltage. Shunt regulator 200 is shown for illustrative purposes only; the shunt regulator 116 of FIG. 1 may have any appropriate configuration for overloading the output of TRU 111.

FIG. 3 illustrates an embodiment of a method 300 of operating a GCU having a shunt regulator for overvoltage protection at a TRU output. Method 300 is discussed with reference to FIG. 1. In block 301, an overvoltage occurs in electrical generating system 100, i.e., a voltage at the output of TRU 111 exceeds a reference voltage. In block 302, the shunt regulator 116 is activated. In block 303, the shunt regulator overloads output of TRU 111, causing the voltage available to the DC bus 112 to drop to the level of the reference voltage. In block 304, an overvoltage protection module (such as either of overvoltage protection modules 105 or 106) responds to the overvoltage, and the shunt regulator is deactivated.

The technical effects and benefits of exemplary embodiments include relatively fast response to overvoltage conditions in an electrical generating system.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electrical system, comprising:
an alternating current (AC) source;
a transformer rectifier unit (TRU) connected to the AC source, the TRU configured to receive AC power from the AC source, convert the AC power to direct current (DC) power, and output DC power;
a DC bus configured to receive the DC power output by the TRU;
at least one DC load powered by the DC bus;
a shunt regulator connected to the output of the TRU, the shunt regulator configured to overload the output of the TRU based on an overvoltage condition at the output of the TRU, such that a voltage available to the DC bus during the overvoltage condition does not exceed a reference voltage; and
an overvoltage protection module configured to limit the AC power received from the AC source by the TRU based on the overvoltage condition, wherein the shunt regulator is configured to deactivate based on the overvoltage protection module limiting the AC power output by the AC source.

2. The electrical system of claim 1, wherein the AC source comprises a generator connected to an AC bus.

3. The electrical system of claim 1, wherein the reference voltage comprises an input to the shunt regulator.

4. The electrical system of claim 3, wherein the shunt regulator comprises:
   an operational amplifier, the operational amplifier configured to receive the reference voltage and an output voltage of the TRU as inputs.

5. The electrical system of claim 1, wherein the electrical system comprises an electrical generating system of an aircraft.

6. A method for limiting an overvoltage condition at an output of a transformer rectifier unit (TRU) of an electrical system, the method comprising:
   receiving alternating current (AC) power from an AC source at an input of TRU;
   converting the AC power to direct current (DC) power by the TRU; and
   outputting the DC power by the TRU to a DC load at the output of the TRU via a DC bus;
   activating a shunt regulator based on the overvoltage condition at the output of the TRU, the shunt regulator being connected to the output of the TRU;
   overloading the output of the TRU by the shunt regulator such that a voltage available to the DC bus is less than a reference voltage;
   limiting the AC voltage received from the AC source at the input of the TRU based on the overvoltage condition by an overvoltage protection module; and
   deactivating the shunt regulator based on the overvoltage protection module limiting the AC power output by the AC source.

7. The method of claim 6, wherein the AC source comprises a generator connected to an AC bus.

8. The method of claim 6, wherein the reference voltage comprises an input to the shunt regulator.

9. The method of claim 8, wherein the shunt regulator comprises:
   an operational amplifier, the operational amplifier configured to receive the reference voltage and an output voltage of the TRU as inputs.

10. The method of claim 6, wherein the electrical system comprises an electrical generating system of an aircraft.

11. A shunt regulator for an electrical system, the electrical system comprising a transformer rectifier unit (TRU), comprising:
    an operational amplifier, the operational amplifier configured to receive a reference voltage and an output voltage of the TRU as inputs, wherein the shunt regulator is configured to overload the output of the TRU based on an overvoltage condition at the output of the TRU, such that a voltage available to the DC bus during the overvoltage condition does not exceed the reference voltage;
    wherein the electrical system comprises:
       an alternating current (AC) source, wherein the TRU is configured to receive AC power from the AC source, convert the AC power to direct current (DC) power, and output the DC power;
       a DC bus configured to receive the DC power output by the TRU;
       at least one DC load powered by the DC bus; and
       an overvoltage protection module configured to limit the AC power received from the AC source by the TRU based on the overvoltage condition, wherein the shunt regulator is configured to deactivate based on the overvoltage protection module limiting the AC power output by the AC source.

12. The shunt regulator of claim 11, wherein the AC source comprises a generator connected to an AC bus.

* * * * *